United States Patent
Xiao et al.

(10) Patent No.: US 10,984,818 B2
(45) Date of Patent: Apr. 20, 2021

(54) DEVICES AND METHODS FOR EVALUATING SPEECH QUALITY

(71) Applicant: Huawei Technologies Co., Ltd., Shenzhen (CN)

(72) Inventors: Wei Xiao, Munich (DE); Mona Hakami, Lower Hutt (NZ); Willem Bastiaan Kleijn, Wellington (NZ)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 16/270,274

(22) Filed: Feb. 7, 2019

(65) Prior Publication Data
US 2019/0172479 A1  Jun. 6, 2019

Related U.S. Application Data

(63) Continuation of application No. PCT/EP2016/068966, filed on Aug. 9, 2016.

(51) Int. Cl.
*G10L 25/60* (2013.01)
*G10L 25/30* (2013.01)
(Continued)

(52) U.S. Cl.
CPC .......... *G10L 25/60* (2013.01); *G06F 17/18* (2013.01); *G10L 15/02* (2013.01); *G10L 25/03* (2013.01); *G10L 25/30* (2013.01); *G10L 25/69* (2013.01)

(58) Field of Classification Search
USPC ................... 704/200–232, 500–504
See application file for complete search history.

(56) References Cited

U.S. PATENT DOCUMENTS 7,164,771 B1   1/2007 Treurniet et al.
8,140,069 B1 * 3/2012 Lall .................... H04M 1/24
                                            455/423
(Continued)

FOREIGN PATENT DOCUMENTS

EP   2881940 A1   6/2015

OTHER PUBLICATIONS

Beerends et al, "Perceptual Objective Listening Quality Assessment (POLQA), The Third Generation ITU-T Standard for End-to-End Speech Quality Measurement Part I—Temporal Alignment," J. Audio Eng. Soc., vol. 61, No. 6, pp. 1-19 (Jun. 2013).
(Continued)

*Primary Examiner* — Jesse S Pullias
(74) *Attorney, Agent, or Firm* — Leydig, Voit & Mayer, Ltd.

(57) ABSTRACT

The disclosure relates to an apparatus for determining a quality score (MOS) for an audio signal sample, the apparatus comprising: an extractor configured to extract a feature vector from the audio signal sample, wherein the feature vector comprises a plurality of feature values and wherein each feature value is associated to a different feature of the feature vector; a pre-processor configured to pre-process a feature value of the feature vector based on a cumulative distribution function associated to the feature represented by the feature value to obtain a pre-processed feature value; and a processor configured to implement a neural network and to determine the quality score (MOS) for the audio signal sample based on the pre-processed feature value and a set of neural network parameters for the neural network associated to the cumulative distribution function.

22 Claims, 14 Drawing Sheets

(51) Int. Cl.
*G10L 25/69* (2013.01)
*G06F 17/18* (2006.01)
*G10L 15/02* (2006.01)
*G10L 25/03* (2013.01)

(56) References Cited

U.S. PATENT DOCUMENTS

| | | | | |
|---|---|---|---|---|
| 8,233,590 | B2* | 7/2012 | Chung | H04M 3/2236 379/1.01 |
| 2002/0097840 | A1 | 7/2002 | Hardy | |
| 2003/0103667 | A1* | 6/2003 | Soliman | G10L 19/00 382/157 |
| 2004/0002852 | A1 | 1/2004 | Kim | |
| 2004/0153315 | A1* | 8/2004 | Reynolds | G10L 25/69 704/208 |
| 2007/0011006 | A1 | 1/2007 | Kim | |
| 2008/0103783 | A1* | 5/2008 | Kang | G10L 25/69 704/500 |
| 2008/0114595 | A1* | 5/2008 | Vair | G10L 15/08 704/236 |
| 2009/0018825 | A1 | 1/2009 | Bruhn et al. | |
| 2012/0245927 | A1* | 9/2012 | Bondy | G10L 21/0232 704/203 |
| 2013/0155866 | A1* | 6/2013 | Sun | G10L 25/69 370/241 |
| 2014/0358526 | A1* | 12/2014 | Abdelal | G10L 15/16 704/202 |

OTHER PUBLICATIONS

Beerends et al, "Perceptual Objective Listening Quality Assessment (POLQA), The Third Generation ITU-T Standard for End-to-End Speech Quality Measurement Part II—Perceptual Model," J. Audio Eng. Soc., vol. 61, No. 6, pp. 1-18 (Jun. 2013).

"Series G: Transmission Systems and Media, Digital Systems and Networks International telephone connections and circuits—Transmission planning and the E-model The E-model: a computational model for use in transmission planning," ITU-T G.107, International Union of Telecommunication—Geneva, Switzerland (Apr. 2009).

Kim et al, "ANIQUE+ : A New American National Standard for Non-Intrusive Estimation of Narrowband Speech Quality," Bell Labs Technical Journal 12(1), pp. 221-236 (2007).

"Series P: Telephone Transmission Quality, Telephone Installations, Local Line Networks, Objective measuring apparatus, Single-ended method for objective speech quality assessment in narrow-band telephony applications," pp. 1-66, Institute of Electrical and Electronics Engineers—New York, New York (May 2004).

Malfait et al., "P.563—The ITU-T Standard for Single-Ended Speech Quality Assessment," IEEE Transactions on Audio, Speech, and Language Processing, vol. 14, No. 6, pp. 1-11, Institute of Electrical and Electronics Engineers—New York, New York (Nov. 2006).

"Series P: Terminals and Subjective and Objective Assessment Methods, Methods for objective and subjective assessment of speech quality, Perceptual objective listening quality assessment," ITU-T P.863, pp. 1-76, International Union of Telecommunication—Geneva, Switzerland (Jan. 2011).

"Series P: Telephone Transmission Quality Methods for objective and subjective assessment of quality, Methods for Subjective Determination of Transmission Quality," ITU-T P.800, pp. 1-37,International Union of Telecommunication—Geneva, Switzerland (Aug. 1996).

Mossavat et al, "A Bayesian Hierarchical Mixture of Experts Approach to Estimate Speech Quality," Quality of Multimedia Experience (QoMEX), pp. 1-6 (Jul. 2010).

Mossavat et al, "A Hierarchical Bayesian Approach to Modeling Heterogeneity in Speech Quality Assessment," IEEE Transactions on Audio, Speech, and Language Processing, vol. 20, No. 1, pp. 1-11, Institute of Electrical and Electronics Engineers—New York, New York (Jan. 2012).

Petkov et al, "A Bayesian Approach to Non-Intrusive Quality Assessment of Speech," INTERSPEECH 2009, 10th Annual Conference of the International Speech Communication Association, Brighton, United Kingdom, pp. 1-4 (Sep. 6-10, 2009).

Petkov et al, "Probabilistic Non-Intrusive Quality Assessment of Speech for Bounded-Scale Preference Scores," QoMEX, pp. 1-6 (2010).

Grancharov et al, "Non-Intrusive Speech Quality Assessment with Low Computational Complexity," Interspeech, pp. 1-4 (2006).

Kotsiantis et al, "Data Preprocessing for Supervised Leaning," International Journal of Computer Science , vol. 1, No. 1, pp. 1-8 (2006).

Hanet et al, "Data Mining—Concepts and Techniques," 3rd ed., Amsterdam: Morgan Kaufmann Publishers, pp. 1-740 (2012).

Mendelsohn, "Preprocessing Data for Neural Networks," url: http://www.tradertech.com/neural-networks/preprocessing-data, pp. 1-8 (Feb. 21, 2019).

Hinton et al, "Improving neural networks by preventing co-adaptation of feature detectors," arXiv:1207.0580v1 [cs.NE], pp. 1-18 (Jul. 3, 2012).

Walfish, "A Review of Statistical Outlier Methods," Pharmaceutical Technology, pp. 1-5 ( Nov. 2, 2006).

Cousineau et al., "Outliers detection and treatment: a review," International Journal of Psychological Research, vol. 3. No. 1., pp. 1-11 (2010).

"Series P: Telephone Transmission Quality, Telephone Installations, Local Line Networks, ITU-T coded-speech database," pp. 1-13, ITU-T Series P Supplement 23, International Union of Telecommunication—Geneva, Switzerland (Feb. 1998).

"Neural Network FAQ, part 2 of 7: Learning," Retrieved from ftp://ftp.sas.com/pub/neural/FAQ2.html., pp. 1-63 (Mar. 13, 2019).

McGill et al, "Variations of Box Plots," The American Statistician, vol. 32, No. 1, pp. 12-16 (Feb. 1978).

Pyle, "Data Preparation for Data Mining," San Francisco, CA, pp. 1-466, USA: Morgan Kaufmann Publishers Inc., (1999).

* cited by examiner

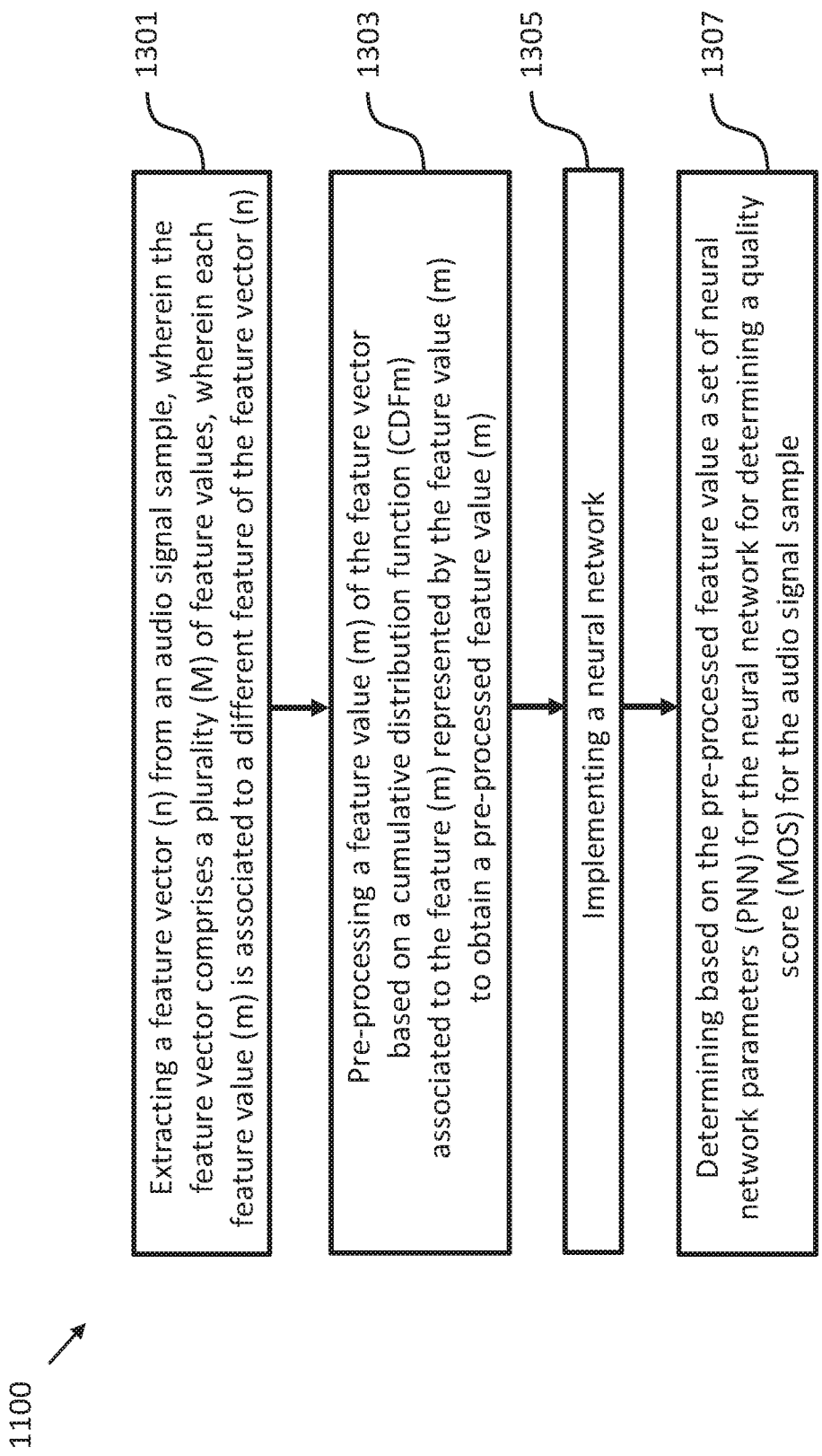

DEVICES AND METHODS FOR EVALUATING SPEECH QUALITY

CROSS-REFERENCE TO RELATED APPLICATIONS

This application is a continuation of International Application No. PCT/EP2016/068966, filed on Aug. 9, 2016, the disclosure of which is hereby incorporated by reference in its entirety.

TECHNICAL FIELD

Generally, embodiments of the disclosure relate to the field of audio processing. More specifically, embodiments of the disclosure relate to devices and methods for evaluating speech quality of audio signal samples on the basis of a neural network and/or machine learning.

BACKGROUND

Network operators providing services involving speech, such as telephony services, want to assure that the perceived quality of such services meet certain speech quality requirements. The most reliable method for assessing speech quality is the so-called subjective assessment, where a panel of human subjects is asked to listen to transmitted speech signals and score their quality, as illustrated in FIG. 1a.

One of the most widely used listening tests is the absolute category rating (ACR) method, described in the International Telecommunication Union (ITU-T) Recommendation P.800. In this test, several subjects are asked to rate the quality of a number of short speech sentences processed by the system under test using a five-point scale (5: excellent, 4: good, 3: fair, 2: poor, and 1: bad). The average rating is commonly referred to as the "Mean Opinion Score (MOS)", Depending on the test results, network operators can assess the user experience of their services and, if necessary, improve the quality thereof.

However, as subjective speech quality tests are generally very laborious and time-consuming, objective speech quality tests have been introduced, which allow assessing speech quality in an automatic manner and which aim to deliver estimated MOS values that are highly correlated with the MOSs obtained from subjective listening experiments. Essentially, in objective speech quality tests the listener panel required in subjective speech quality tests is replaced by a computational algorithm. Such a computational algorithm implemented as part of an objective speech quality test, generally, requires some kind of prior training, e.g. machine learning, on the basis of a database of speech training samples.

Generally, known objective speech quality tests are based on a model, which can be classified according to the following main categories: (i) intrusive or non-intrusive models and (ii) parametric or waveform models.

In an intrusive model both a processed, usually degraded speech signal and the original reference speech signal are available for the objective speech quality test. Often, however, for instance in real-time scenarios, only the processed speech signal is available for the objective speech quality test, which is referred to as a non-intrusive model. FIGS. 1b and 1c show a schematic illustration of an intrusive model and a non-intrusive model, respectively.

The goal of a parametric model is to estimate speech quality on the basis of some analytical form (e.g., polynomial function) of the feature set and using as input a codec pattern, coding rate, packet loss rate or the like. The parametric model usually has a low computational complexity and is widely used in network planning. However, there is often a substantial gap between the quality estimated by a parametric model and the "perceptual" quality, e.g. the quality perceived by a user.

In comparison to the parametric model, the waveform model tries to estimate the quality based signal processing. More specifically, the waveform model may extract the feature vector on the basis of some psychoacoustic principles. As a result, the output of the waveform model mostly outperforms the output provided by a parametric model with respect to "perceptual" quality, but the complexity of a waveform model is generally much higher than that of a parametric model.

The following major industrial standards have been defined in this field: ITU-T P.863, which is based on an intrusive waveform model, ITU-T P.563, which is based on a non-intrusive waveform model, and e-model, which is based on a parametric model.

In light of the above there is a need for further improvements of devices and methods for evaluating speech quality of audio signal samples on the basis of a neural network and/or machine learning.

SUMMARY

It is an object of the disclosure to provide improved devices and methods for evaluating speech quality of audio signal samples on the basis of a neural network and/or machine learning.

This object is achieved by the features of the independent claims. Further implementation forms are apparent from the dependent claims, the description and the figures.

As already described above, objective speech quality tests, generally, require some kind of prior training of the quality assessment algorithm implemented therein, usually based on a database of speech training samples. The present disclosure is based on the finding that the efficiency of the training process as well as the results provided by the trained system strongly depend on specific properties of the training samples. More specifically, the present disclosure is based on the finding that a smooth relation between input and output generally is easier to learn for a training algorithm than a non-smooth relationship, in particular for training algorithms relying on some form of gradient descent to adjust the input-output mapping parameters. The present disclosure is further based on the finding that it is difficult to learn a correct mapping for extreme feature values that occur rarely, e.g. the machine-learning algorithm may lead to anomalous mappings in sparsely populated regions for which few training data are available.

Thus, according to a first aspect the disclosure relates to an apparatus for determining a quality score (MOS) for an audio signal sample, the apparatus comprising: an extractor configured to extract a feature vector from the audio signal sample, wherein the feature vector comprises a plurality (M) of feature values, wherein each feature value (m) is associated to a different feature of the feature vector; a pre-processor configured to pre-process a feature value (m) of the feature vector based on a cumulative distribution function (CDFm) associated to the feature (m) represented by the feature value (m) to obtain a pre-processed feature value (m); and a processor configured to implement a neural network and to determine the quality score (MOS) for the audio signal sample based on the pre-processed feature value and a set of neural network parameters (PNN) for the neural network associated to the cumulative distribution function (CDFm).

Thus, an improved apparatus for determining a quality score (MOS) for an audio signal sample is provided.

The audio signal sample maybe a frame or a combination of multiple frames, e.g. derived from a speech file.

In a first possible implementation form of the apparatus according to the first aspect as such, the pre-processor is configured to pre-process the feature value by mapping the feature value of the feature to a function value, e.g. a CDF value, of the cumulative distribution function (CDFm) associated to the feature.

The cumulative distribution function (CDFm) associated to the feature may, for example, have been Obtained based on a training set of feature values or feature vectors.

In a second possible implementation form of the apparatus according to the first aspect as such or the first implementation form thereof, the cumulative distribution function (CDFm) is a uniform distribution function.

In a third possible implementation form of the apparatus according to the first aspect as such or the first or second implementation form thereof, the cumulative distribution function (CDFm) is a uniform distribution function on the interval [0, 1]. In other words, in the third possible implementation form the cumulative distribution function (CDFm) is a uniform distribution function, which comprises non-zero function values only in the range from 0 to 1.

In a fourth possible implementation form of the apparatus according to the first aspect as such or any one of the first to third implementation form thereof, the apparatus is configured to determine the cumulative distribution function (CDFm) associated to the feature (m) during a training phase, or the cumulative distribution function (CDFm) associated to the feature (m) was obtained or is obtainable based on a training set of (respective) feature values or feature vectors, for example during a training phase.

In a fifth possible implementation form of the apparatus according to the first aspect as such or any one of the first to fourth implementation form thereof, the processor is configured to implement the neural network, for example, as an auto-encoder neural network for unsupervised learning or a multi-layer perception (MLP) neural network for supervised learning. Further implementation forms may be configured to implement other supervised or non-supervised neural networks.

According to a second aspect the disclosure relates to a corresponding method for determining a quality score (MOS) for an audio signal sample, wherein the method comprises the steps of: extracting a feature vector from the audio signal sample, wherein the feature vector comprises a plurality (M) of feature values, wherein each feature value (m) is associated to a different feature of the feature vector; pre-processing a feature value (m) of the feature vector based on a cumulative distribution function (CDFm) associated to the feature (m) represented by the feature value (m) to obtain a pre-processed feature value (m); implementing a neural network; and determining the quality score (MOS) for the audio signal sample based on the pre-processed feature value and a set of neural network parameters (PNN) for the neural network associated to the cumulative distribution function (CDFm).

In a first possible implementation form of the method according to the second aspect as such, wherein the step of pre-processing the feature value comprises the step of mapping the feature value of the feature to a function value, e.g. a CDF value, of the cumulative distribution function (CDFm) associated to the feature.

In a second possible implementation form of the method according to the second aspect as such or the first implementation form thereof, the cumulative distribution function (CDFm) is a uniform distribution function.

In a third possible implementation form of the method according to the second aspect as such or the first or second implementation form thereof, the cumulative distribution function (CDFm) is a uniform distribution function on the interval [0, 1].

In a fourth possible implementation form of the method according to the second aspect as such or any one of the first to third implementation form thereof, the method comprises the further step of determining the cumulative distribution function (CDFm) associated to the feature (m) during a training phase, or the cumulative distribution function (CDFm) associated to the feature (m) was obtained or is obtainable based on a training set of respective feature values or feature vectors, for example during a training phase.

In a fifth possible implementation form of the method according to the second aspect as such or any one of the first to fourth implementation form thereof, the step of implementing the neural network comprises, for example, the step of implementing the neural network as a multi-layer perception (MLP) neural network for supervised learning or an auto-encoder neural network for unsupervised learning. Further implementation forms may be configured to implement other supervised or non-supervised neural networks.

According to a third aspect the disclosure relates to an apparatus for determining a set of neural network parameters (PNN) for determining a quality score (MOS) for an audio signal sample, wherein the apparatus comprises: an extractor configured to extract a feature vector (n) from an audio signal sample, wherein the feature vector comprises a plurality (M) of feature values; wherein each feature value (m) is associated to a different feature of the feature vector (n); a pre-processor configured to pre-process a feature value (m) of the feature vector (n) based on a cumulative distribution function (CDFm) associated to the feature (m) represented by the feature value (m) to obtain a pre-processed feature value (m); and a processor configured to implement a neural network and to determine based on the pre-processed feature value the set of neural network parameters (PNN) for the neural network for determining the quality score (MOS) for the audio signal sample.

In a first possible implementation form of the apparatus according to the third aspect as such, the pre-processor is configured to pre-process the feature value by mapping the feature value of the feature to a function value, e.g. a CDF value, of the cumulative distribution function (CDFm) associated to the feature.

In a second possible implementation form of the apparatus according to the third aspect as such or the first implementation form thereof, the cumulative distribution function (CDFm) is a uniform distribution function.

In a third possible implementation form of the apparatus according to the third aspect as such or the first or second implementation form thereof, the cumulative distribution function (CDFm) is a uniform distribution function on the interval [0, 1].

In a fourth possible implementation form of the apparatus according to the third aspect as such or any one of the first to third implementation form thereof, the pre-processor is further configured to determine a histogram of feature values associated to a feature (m) of the plurality (M) of features based on feature values associated to the same feature (m) over a plurality of feature vectors, and to determine the cumulative distribution function (CDFm) associated to the respective feature (m) based on the histogram of feature values determined for the respective feature (m).

In a fifth possible implementation form of the apparatus according to the fourth implementation of the third aspect, the pre-processor is further configured to determine the cumulative distribution function (CDFm) associated to the feature (m) by summing a number of occurrences of each histogram bin over the histogram bins of the histogram of the feature values.

In a sixth possible implementation form of the apparatus according to the third aspect as such or any one of the first to fourth implementation form thereof, the pre-processor is further configured to determine a Gaussian distribution, e.g. represented or defined by μ and σ, for feature values associated to a feature (m) of the plurality (M) of features based on feature values associated to the same feature (m) over a plurality of feature vectors, and to determine the cumulative distribution function (CDFm) associated to the feature (m) based on the Gaussian distribution (μ, σ) for the feature values determined for the feature (m).

In other words, in the sixth possible implementation form of the apparatus according to the third aspect the pre-processor is further configured to determine the cumulative distribution function (CDFm) associated to the feature (m) based on a Gaussian distribution (μ, σ) determined for feature values associated to the same feature (m) from a plurality of feature vectors.

In a seventh possible implementation form of the apparatus according to the sixth implementation form of the third aspect, the pre-processor is further configured to determine the cumulative distribution function (CDFm) associated to the feature (m) by using a mixture of Gaussian distributions (μ, σ) for feature values associated to the feature (m) of the plurality (M) of features.

In an eighth possible implementation form of the apparatus according to the sixth or seventh implementation form of the third aspect, the pre-processor is further configured to determine parameters of the Gaussian distribution (μ, σ) or the mixture of the Gaussian distributions for feature values associated to the feature (m) of the plurality (M) of features by using an expectation-minimization algorithm.

According to a fourth aspect the disclosure relates to a corresponding method for determining a set of neural network parameters (PNN) for determining a quality score (MOS) for an audio signal sample, wherein the method comprises the following steps: extracting a feature vector (n) from an audio signal sample, wherein the feature vector comprises a plurality (M) of feature values and wherein each feature value (m) is associated to a different feature of the feature vector (n); pre-processing a feature value (m) of the feature vector (n) based on a cumulative distribution function (CDFm) associated to the feature (m) represented by the feature value (m) to obtain a pre-processed feature value (m); implementing a neural network; and determining based on the pre-processed feature value the set of neural network parameters (PNN) for the neural network for determining the quality score (MOS) for the audio signal sample.

In a first possible implementation form of the method according to the fourth aspect as such, the step of pre-processing the feature value comprises the step of mapping the feature value of the feature to a function value, i.e. a CDF value, of the cumulative distribution function (CDFm) associated to the feature.

In a second possible implementation form of the method according to the fourth aspect as such or the first implementation form thereof, the cumulative distribution function (CDFm) is a uniform distribution function.

In a third possible implementation form of the method according to the fourth aspect as such or the first or second implementation form thereof, the cumulative distribution function (CDFm) is a uniform distribution function on the interval [0, 1].

In a fourth possible implementation form of the method according to the fourth aspect as such or the any one of the first to third implementation form thereof, the method comprises the further steps of determining a histogram of feature values associated to a feature (m) of the plurality (M) of features based on feature values associated to the same feature (m) over a plurality of feature vectors and determining the cumulative distribution function (CDFm) associated to the respective feature (m) based on the histogram of feature values determined for the respective feature (m).

In a fifth possible implementation form of the method according to the fourth implementation of the fourth aspect, the step of determining the cumulative distribution function (CDFm) associated to the feature (m) comprises the step of summing a number of occurrences of each histogram bin over the histogram bins of the histogram of the feature values.

In a sixth possible implementation form of the method according to the fourth aspect as such or any one of the first to fourth implementation form thereof, the method comprises the further steps of determining a Gaussian distribution (μ, σ) for feature values associated to a feature (m) of the plurality (M) of features based on feature values associated to the same feature (m) over a plurality of feature vectors and determining the cumulative distribution function (CDFm) associated to the feature (m) based on the Gaussian distribution (μ, σ) for the feature values determined for the feature (m).

In a seventh possible implementation form of the method according to the sixth implementation form of the fourth aspect, the step of determining the cumulative distribution function (Cahn) associated to the feature (m) comprises the step of using a mixture of Gaussian distributions (μ, σ) for feature values associated to the feature (m) of the plurality (M) of features.

In an eighth possible implementation form of the method according to the sixth or seventh implementation form of the fourth aspect, the method comprises the further step of determining parameters of the Gaussian distribution (μ, σ) or the mixture of the Gaussian distributions for feature values associated to the feature (m) of the plurality (M) of features by using an expectation-minimization algorithm.

According to a fifth aspect the disclosure relates to an apparatus for determining a set of neural network parameters (PNN) for determining a quality score (MOS) for an audio signal sample, wherein the apparatus comprises: an extractor configured to extract a feature vector (n) from an audio signal sample, wherein the feature vector comprises a plurality (M) of feature values and wherein each feature value (m) is associated to a different feature of the feature vector (n); a pre-processor configured to pre-process a feature value (m) of the feature vector (n) based on a cumulative distribution function (CDFin) associated to the feature (m) represented by the feature value (m) to obtain a pre-processed feature value (m); wherein the pre-processor is configured to map the feature value (mn) of the feature (m) to a function value, e.g. a CDF value, of the cumulative distribution function (CDFm) associated to the feature (m) to obtain an intermediate feature value, and to map the intermediate feature value to a function value of an inverse distribution function associated to the feature (m) to obtain the pre-processed feature value (m), wherein the inverse distribution function is an inverse distribution function of the cumulative distribution function (CDFm) associated to the feature (m), which is different to an original distribution function associated to the feature (m), or, wherein the pre-processor is configured to map the feature value (inn) of the feature vector to a function value of a combined distribution function to obtain the pre-processed feature value, wherein function values of the distribution function correspond to function values obtainable by firstly mapping the feature value to the cumulative distribution function (CDFm) associated to the feature (m) and secondly mapping the resulting intermediate feature value to a functional value of the inverse distribution function associated to the feature (m); and a processor configured to implement a neural network, and to determine based on the pre-processed feature value the set of neural network parameters (PNN) for the neural network for determining the quality score (MOS) for the audio signal sample.

According to a sixth aspect the disclosure relates to a corresponding method of determining a set of neural network parameters (PNN) for determining a quality score (MOS) for an audio signal sample, wherein the method comprises: extracting a feature vector (n) from an audio signal sample, wherein the feature vector comprises a plurality (M) of feature values and wherein each feature value (m) is associated to a different feature of the feature vector (n); pre-processing a feature value (m) of the feature vector (n) based on a cumulative distribution function (CDFm) associated to the feature (m) represented by the feature value (m) to obtain a pre-processed feature value (m), wherein the pre-processing step comprises the steps of mapping the feature value (mn) of the feature (m) to a function value, e.g. a CDF value, of the cumulative distribution function (CDFm) associated to the feature (m) to obtain an intermediate feature value and mapping the intermediate feature value to a function value of an inverse distribution function associated to the feature (m) to obtain the pre-processed feature value (m), wherein the inverse distribution function is an inverse distribution function of the cumulative distribution function (CDFm) associated to the feature (m), which is different to an original distribution function associated to the feature (m), or, wherein the pre-processing step comprises the step of mapping the feature value (mn) of the feature vector to a function value of a combined distribution function to obtain the pre-processed feature value, wherein function values of the distribution function correspond to function values obtainable by firstly mapping the feature value to the cumulative distribution function (CDFm) associated to the feature (m) and secondly mapping the resulting intermediate feature value to a functional value of the inverse distribution function associated to the feature (m); implementing a neural network; and determining based on the pre-processed feature value the set of neural network parameters (PNN) for the neural network for determining the quality score (MOS) for the audio signal sample.

According to a seventh aspect the disclosure relates to an apparatus for determining a quality score (MOS) for an audio signal sample, wherein the apparatus comprises: an extractor configured to extract a feature vector from the audio signal sample, wherein the feature vector comprises a plurality (M) of feature values and wherein each feature value (m) is associated to a (different) feature of the feature vector; a pre-processor configured to pre-process a feature value (m) of the feature vector (n) based on a cumulative distribution function (CDFm) associated to the feature (m) represented by the feature value (m) to obtain a pre-processed feature value (m); wherein the pre-processor is configured to map the feature value (mn) of the feature (m) to a function value, e.g. a CDF value, of the cumulative distribution function (CDFm) associated to the feature (m) to obtain an intermediate feature value, and to map the intermediate feature value to a function value of an inverse distribution function associated to the feature (m) to obtain the pre-processed feature value (m), wherein the inverse distribution function is an inverse distribution function of the cumulative distribution function (CDFm) associated to the feature (m), which is different to an original distribution function associated to the feature (m), or, wherein the pre-processor is configured to map the feature value (mn) of the feature vector to a function value of a combined distribution function to obtain the pre-processed feature value, wherein function values of the distribution function correspond to function values obtainable by firstly mapping the feature value to the cumulative distribution function (CDFm) associated to the feature (m) and secondly mapping the resulting intermediate feature value to a functional value of the inverse distribution function associated to the feature (m); and a processor configured to implement a neural network and to determine the quality score (MOS) for the audio signal sample based on the pre-processed feature value and a set of neural network parameters (PNN) for the neural network associated to the cumulative distribution function (CDFm).

According to an eighth aspect the disclosure relates to a corresponding method for determining a quality score (MOS) for an audio signal sample, wherein the method comprises the following steps; extracting a feature vector from the audio signal sample, wherein the feature vector comprises a plurality (M) of feature values and wherein each feature value (m) is associated to a (typically different) feature of the feature vector; pre-processing a feature value (m) of the feature vector (n) based on a cumulative distribution function (CDFm) associated to the feature (m) represented by the feature value (m) to obtain a pre-processed feature value (m), wherein the pre-processing step comprises the steps of mapping the feature value (mn) of the feature (m) to a function value, e.g. a CDF value, of the cumulative distribution function (CD m) associated to the feature (m) to obtain an intermediate feature value and mapping the intermediate feature value to a function value of an inverse distribution function associated to the feature (m) to obtain the pre-processed feature value (m), wherein the inverse distribution function is an inverse distribution function of the cumulative distribution function (CDFm) associated to the feature (m), which is different to an original distribution function associated to the feature (m), or, wherein the pre-processing step comprises the step of mapping the feature value (Inn) of the feature vector to a function value of a combined distribution function to obtain the pre-processed feature value, wherein function values of the distribution function correspond to function values obtainable by firstly mapping the feature value to the cumulative distribution function (CDFm) associated to the feature (m) and secondly mapping the resulting intermediate feature value to a functional value of the inverse distribution function associated to the feature (m); implementing a neural network; and determining the quality score (MOS) for the audio signal sample based on the pre-processed feature value and a set of neural network parameters (PNN) for the neural network associated to the cumulative distribution function (CDFm).

According to a ninth aspect the disclosure relates to a computer program comprising program code for performing the method according to the second aspect of the disclosure, the method according to the fourth aspect of the disclosure, the method according to the sixth aspect of the disclosure and/or the method according to the eighth aspect of the disclosure, or any of the respective implementation forms when executed on a computer.

The disclosure can be implemented in hardware and/or software.

BRIEF DESCRIPTION OF DRAWINGS

Further embodiments of the disclosure will be described with respect to the following figures, wherein:

FIG. 13 shows a method for determining a set of neural network parameters (PNN) for determining a quality score (MOS) for an audio signal sample according to an embodiment.

In the various figures, identical reference signs will be used for identical or at least functionally equivalent features.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

As will be described in more detail further below, embodiments of the present disclosure "pre-distort" or pre-process the features to facilitate the training of a speech quality estimation algorithm based on a neural network, e.g. machine learning. The disclosure is based on the finding that feature distributions that are both smooth and light-tailed (a distribution that has few outliers is light-tailed) are (i) more likely to provide a smooth mapping from the input (the pre-distorted features) to the output and/or (ii) more likely to prevent unseen feature outliers to lead to anomalous mapping.

Figure 1A:
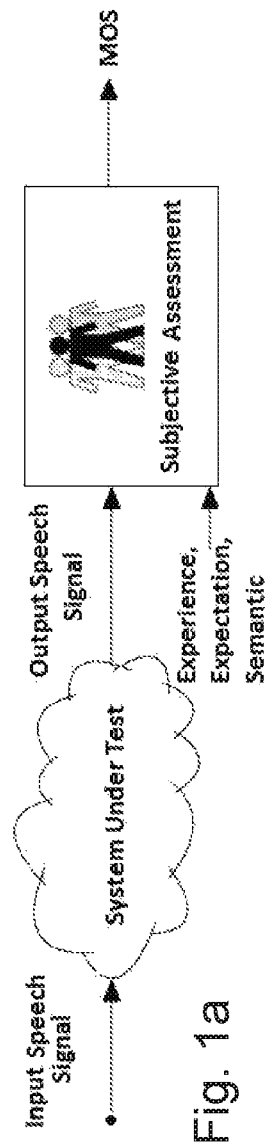
FIGS. 1a-c show schematic diagrams illustrating examples of a subjective speech quality testing system, an intrusive objective speech quality testing system and a non-intrusive objective speech quality testing system.
Figure 1B:
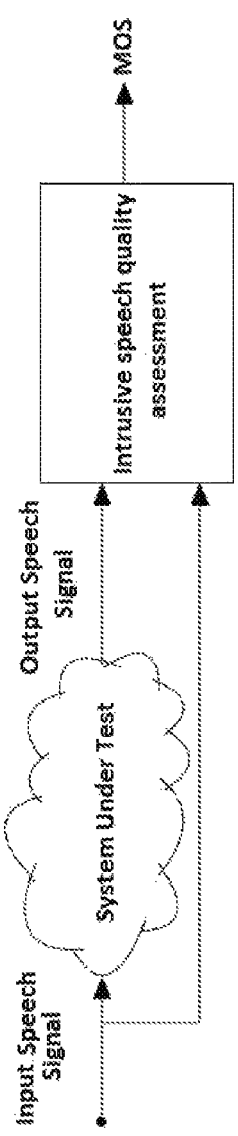
Figure 1C:
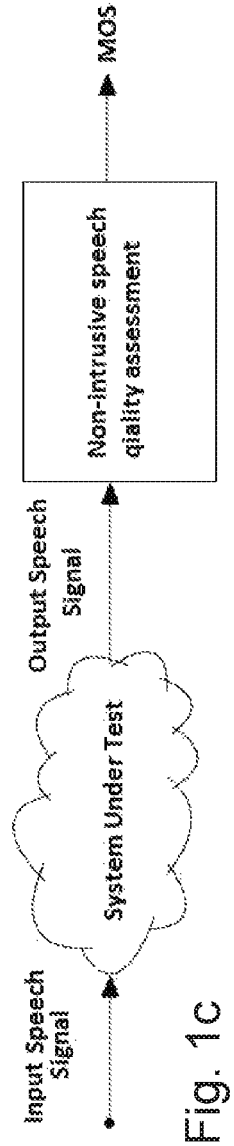
Figure 2:
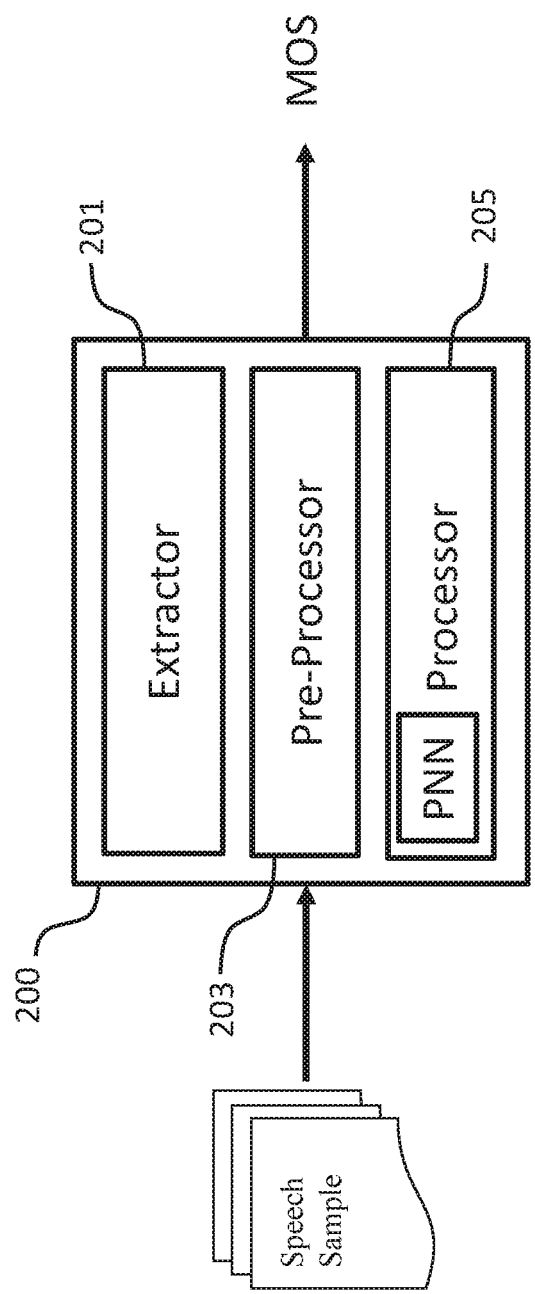
FIG. 2 shows a schematic diagram of an apparatus for determining a quality score (MOS) for an audio signal sample according to an embodiment.

FIG. 2 shows a schematic diagram of an apparatus 200 for determining a quality score (hereinafter also exemplarily referred to as MOS) for an audio signal sample that contains speech according to an embodiment.

The apparatus 200 comprises an extractor 201 configured to extract a feature vector from the audio signal sample, wherein the feature vector comprises a plurality M of feature values and wherein each feature value (index m, m=1 . . . M) is, for example, associated to a different feature (index m) of the feature vector. Furthermore, the apparatus 200 comprises a pre-processor 203 configured to pre-process a feature value (index m) of the feature vector based on a cumulative distribution function (CM) associated to the feature represented by the feature value to obtain a pre-processed feature value (index m). The CDF associated to the feature with index m is also referred to as CDFm.

Furthermore, the apparatus 200 comprises a processor 205 configured to implement a neural network and to determine the quality score (MOS) for the audio signal sample based on the pre-processed feature value (index m) and a set of neural network parameters (hereinafter also referred to as PNN or $P_{NN}$) for the neural network associated to the cumulative distribution function.

Further embodiments of the apparatus 200 shown in FIG. 2 will be described in more detail further below.

Figure 3:
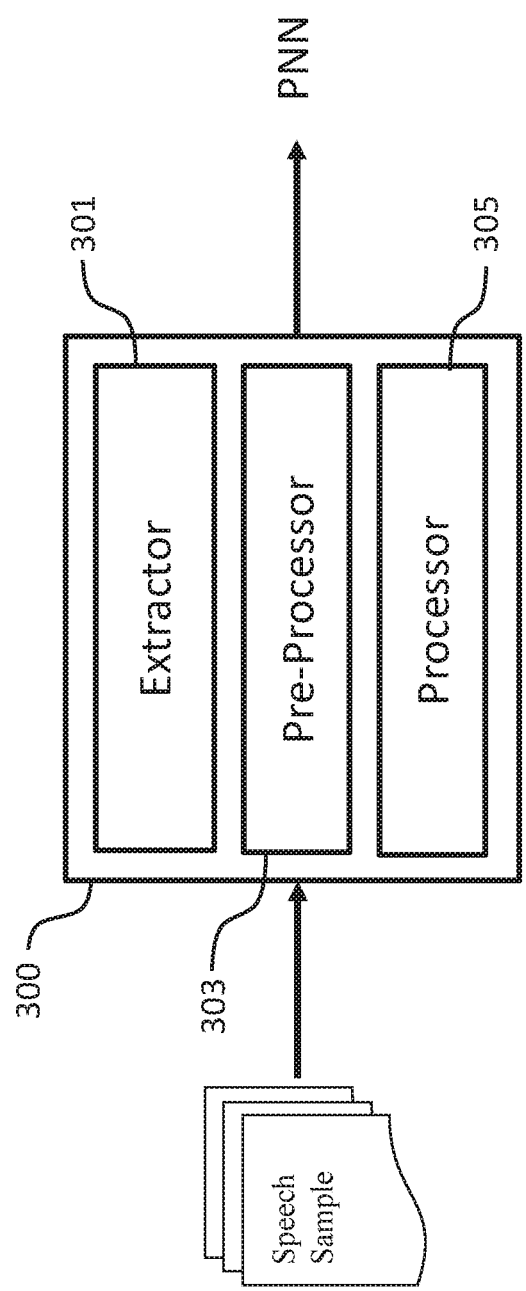
FIG. 3 shows a schematic diagram of an apparatus for determining a set of neural network parameters (PNN) for determining a quality score (MOS) for an audio signal sample according to an embodiment.

FIG. 3 shows a schematic diagram of an apparatus 300 for determining a set of neural network parameters (PNN) for determining a quality score (MOS) for an audio signal sample that contains speech according to an embodiment.

The apparatus 300 comprises an extractor 301 configured to extract a feature vector from the audio signal sample, wherein the feature vector comprises a plurality of feature values (index in, m=1 . . . M) and wherein each feature value is, for example, associated to a different feature (index m) of the feature vector.

Furthermore, the apparatus 300 comprises a pre-processor 303 configured to pre-process a feature value (index m) of the feature vector based on a cumulative distribution function (CDF, respectively CDFm) associated to the feature represented by the feature value to obtain a pre-processed feature value (index m).

Furthermore, the apparatus 300 comprises a processor 305 configured to implement a neural network and to determine based on the pre-processed feature value (index m) the set of neural network parameters (PNN) for the neural network for determining the quality score (MOS) for another audio signal sample.

Further embodiments of the apparatus 200, 300 will be described in the following.

As already described above, the disclosure is based on the finding that feature distributions that are both smooth and light-tailed (a distribution that has few outliers is light-tailed) are (i) more likely to provide a smooth mapping from the input to the output and/or (ii) more likely to prevent unseen feature outliers to lead to an anomalous mapping.

Firstly an example of a non-smooth feature distribution is a feature that has non-zero probability on two disjoint intervals. For instance, a feature may be non-zero on the first interval [0,1] and the second interval [11,12] and the speech quality may not be affected by the gap between the first and second interval. For example, such a behavior may occur if an observed feature y is a discontinuous function of an underlying feature x that is smoothly related to speech quality. As an illustrative example the relation y=x−a sign (x−b) between the observed feature y and the underlying feature with desirable characteristics x is considered, where a and b are constants. A complex relation of this type is difficult to learn for a machine-learning algorithm implemented in a conventional objective speech quality test.

Secondly, an example of a distribution with relatively many outliers with large values is a super-Gaussian distribution, such as a Laplacian distribution. The discrete Fourier coefficients of speech are sometimes modeled as a Laplacian distribution.

Features with non-smooth distributions and outliers are likely to occur in a number of machine learning application areas, including speech quality estimation. In many applications of machine learning it is beneficial to use a large number of input features, either because they may contain new information and/or because their measurement noise may be independent. The usage of a large number of features naturally leads to the inclusion of features that have poor behavior.

As already mentioned above, the disclosure is based on the idea to pre-distort (by way of pre-processing) individually at least a subset of the features extracted from an audio signal sample to obtain a pre-distorted feature for each of the features in the subset such that the pre-distorted feature has a smooth and light-tailed distribution. The pre-distortion operation is performed for the specific goal of facilitating the learning of the mapping from the feature to speech quality.

In the following various embodiments of pre-processors or pre-processing steps 203 and/or 303 are described based on FIGS. 4 to 6.

Figure 4:
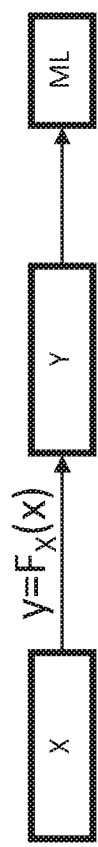
FIG. 4 shows a schematic diagram illustrating a one-stage mapping implemented in embodiments of the disclosure.

FIG. 4 shows a schematic diagram illustrating a pre-processing using one cumulated distribution function for pre-processing, also referred to as 1-stage mapping (index m omitted for easier readability). The idea is to use the CDF values provided by the Y-block shown in FIG. 4 for learning (ML—Machine Learning) and evaluation (using the neural network parameters obtained by ML to determine the quality score). Advantageously, the mapping using the CDF, preferably resulting in a uniform distribution, reduces the learning time and improves the quality assessment.

To create a mapping from an observed feature $\{x_m\}$, where m=1, 2, . . . , M, to a pre-distorted feature, where M is the dimension of an observed feature vector and m the index of the observed feature within the observed feature vector, it is convenient at a conceptual level to first map to a pre-distorted feature with uniform probability distribution. Let $f_X(x_m)$ be the distribution or probability distribution function (PDF) of a random variable $X_m$ representing an observed feature, e.g. the extracted feature. The cumulative distribution of $x_m$ is the probability that $x_m$ assumes a value less than $x_m$:

$$F_{X_m}(x_m) = \int_{-\infty}^{x_m} f_{X_m}(z) dz.$$

Now a new random variable $Y_m = F_X(x_m)$ is considered, which is a deterministic function of the random variable $x_m$. Thus, for a realization $x_m$ of the random variable X (note that $X_m$ is a number) the corresponding realization of $Y_m$ is $y = F_{X_m}(x_m)$. By definition, $Y_m$ has a uniform distribution on the interval [0,1].

As the random variable $Y_m$ has a uniform distribution on the interval [0,1], it does not have outliers and is an extreme example of a light-tailed distribution (it can be considered to have a "zero-tail"). Hence it does not have regions for which it is difficult to learn the relation between input and output. Yet this does not mean that any information of the relation between input and output is lost as the mapping between $X_m$ and $Y_m$ is one-to-one (injective) mapping. On the contrary, details describing the extremes of this mapping can still be learned when sufficient data are available (also note that the estimate of $F_{X_m}$ is more accurate when more data are available, as will be described in more detail further below). Thus, there is no significant drawback to use the pre-processed feature (vector) $Y_m$ instead of the original feature $x_m$ as input for the processor 205, 305, rather doing so is advantageous for the learning rate.

Figure 5A:
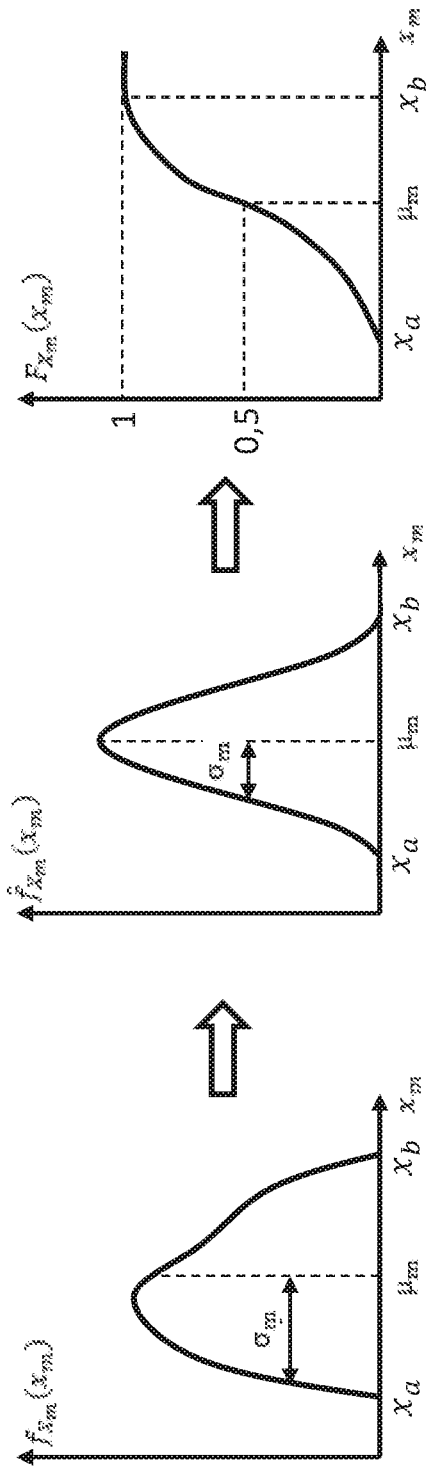
FIGS. 5a and 5b show a schematic diagram illustrating an exemplary mapping implemented in devices and methods according to embodiments of the disclosure.

FIG. 5a shows an exemplary distribution $f_{X_m}(x_m)$ of the extracted feature $x_m$ (on the left side of FIG. 5a) and an exemplary estimated distribution $\hat{f}_{X_m}(x_m)$ for the extracted feature (in the middle of FIG. 5a) obtained by regularization or normalization, and a cumulated distribution function CDFm for the exemplary estimated distribution $\hat{f}_{X_m}(x_m)$ of the extracted feature (right hand side of FIG. 5a).

Figure 5B:
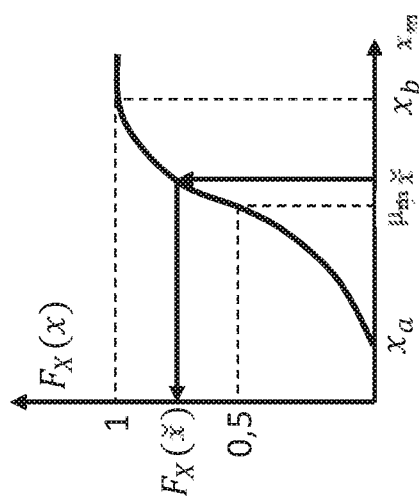

FIG. 5b shows an exemplary mapping of the feature value $X_m$ of feature $x_m$ to a corresponding cumulated distribution function value (CDF value) of the cumulated distribution function $F_{X_m}(x_m)$ derived from or associated to the estimated distribution $\hat{f}_{X_m}(x_m)$ of the extracted feature $\hat{x}$.

The extracted feature $x_m$ may also be referred to as raw feature or observed feature, wherein the $x_a$ represents the minimum observed value of $x_m$, $x_b$, the maximum observed value of $x_m$, $\mu_m$, represents a mean value of the feature $x_m$, and $\sigma_m$ represents a variation value of the feature $x_m$, e.g. obtained over or representative for a training set or a subset of the training set of feature values of the feature $x_m$. The (raw) distribution of extracted features is typically, as exemplarily shown in the left hand side of FIG. 5a, an irregular distribution, or in other words the distribution function $f_{X_m}(x_m)$ of the extracted feature $x_m$ is typically irregular. After estimation of the irregular distribution function and calculation of the CDF, one can consider a new random variable $Y_m = F_{X_m}(x_m)$ with realization $y_m$. For this choice, the probability that $Y_m$ is less than $y_m$ is precisely $y_m$. Hence, the cumulative probability distribution of $Y_m$ is $F_{Y_m}(y_m) = y_m$, and hence $$f_{Y_m}(y_m) = \frac{dF_{Y_m}(y_m)}{d_{y_m}} = 1.$$

This means the distribution of random variable $Y_m$ is uniform. Thus, if we map every observed $x_m$ onto $y_m = F_{X_m}(x_m)$, then $X_m$ is mapped onto a new variable $Y_m$ with a uniform distribution.

The regularizing is optional. In other words, other embodiments may directly determine the cumulative distribution function (CDF) $F_{X_m}(x_m)$ for the initial or raw distribution $f_{X_m}(x_m)$.

The distribution can be described, for example, by a model of a single Gaussian distribution (see mid of FIG. 5a), multiple Gaussian mixture model or a histogram model. For the Gaussian mixture model, one can refer to an expectation-maximization algorithm to estimate the parameters of the distribution $f_{X_m}(x_m)$, and to then determine the corresponding CDF $F_{X_m}(x_m)$.

Figure 6:
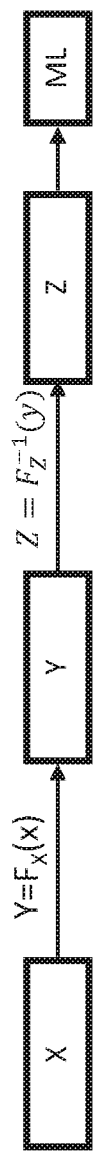
FIG. 6 shows a schematic diagram illustrating a two-stage mapping implemented in embodiments of the disclosure.

Referring now to FIG. 6, in some cases, it may be desirable to have a distribution with (non-zero) light tails as it may match the properties of the quality estimation system implemented in the processor 205, 305. In these cases it is possible to map the feature to a new random variable z with the desired light-tailed distribution $f_Z(z)$. Let $F_Z(z)$ be the cumulative distribution function of Z. For illustrative purposes it is assumed that $F_W$ is monotonically increasing over a contiguous region A. Then an inverse mapping $F_Z^{-1}(.)$ can be defined on [0,1] such that $z = F_Z^{-1}(F_Z(z))$. To obtain the pre-distorted feature Z with the desired distribution $F_Z$, in an embodiment the mapping $z = F_Z^{-1}(F_X(x))$ can be applied to each observed feature realization x. The procedure can be generalized to include the case of a non-decreasing $F_Z$, which corresponds to multi-mode distributions for 2.

The two-stage mapping described above and implemented in embodiments of the disclosure is illustrated in FIG. 6. First, as described with regard to FIGS. 4, 5a and 5b, a cumulative distribution function $F_X(x)$ is determined, for example, to obtain a uniform distribution function in the range [0,1] for the random variable, wherein the realization y of the random variable Y is characterized by the distribution $y = F_X(x)$ (index m omitted for easier readability). According to FIG. 6, now an additional or second mapping is performed as described above, namely the inverse mapping $z = F_Z^{-1}(F_X(x))$, to obtain a second distribution. The second distribution can be pre-determined, for example by a user. Finally the feature value $x_m$ is mapped according to the second distribution function to obtain the pre-processed feature value, which is finally used for the Machine Learning (as depicted in FIG. 6), e.g. for the learning of the neural network parameters as such, or for the evaluation, e.g. for the determining of the quality score (MOS), for example based on the neural network parameters obtained by Machine Learning.

In alternative embodiments, the two mapping stages or steps (Y and Z) are merged into one stage or step ("YZ"), wherein function values of the distribution function correspond to function values obtainable by firstly mapping the feature value to the cumulative distribution function (CDFm) associated to the feature (m) and secondly mapping the resulting intermediate feature value to a functional value of the inverse distribution function associated to the feature (m).

As described above, embodiments of the disclosure determine the cumulative distribution function $F_X$ of the observed feature. In an embodiment, the cumulative distribution function $F_Z$ of the desired feature can be pre-defined by the user in dependence on the specific requirements of the desired distribution. In other words, in an embodiment, the user can pre-define a target cumulative distribution function $F_Z$.

Existing methods can be used for the estimation of $F_X$, such as methods that are based on first estimating $f_X$ and then computing the cumulative distribution function $F_X$ from $f_X$ using integration (for continuous estimates) or summation (for discrete estimates).

According to an embodiment, the cumulative distribution function of $X_m$ can be estimated by means of histograms. For this purpose, the domain of $X_m$ can be divided into I subsequent intervals, or bins, $[x_i, x_{i+1})$, $i \in \{1, \ldots, I\}$ of suitably selected length and the number of occurrences within each interval is stored in a database of cardinality $D = \{x^{(1)}, x^{(2)}, \ldots, x^{(N)}\}$, where N indicates the size of the training database or training set (number of training samples). In an embodiment, a normalization is used and the following estimate can be obtained:

$$f_{X_m}(x_m) = \frac{c_i}{(x_{i+1} - x_i)N}, \quad x_i \leq x_m < x_{i+1}.$$

wherein $c_i$ denotes the number of occurrences/observations the i-th bin.

The estimate for the cumulative distribution function in the region of interest is then $$F_{X_m}(x_m) = \sum_{i=1}^{j} f_{X_m}\left(\frac{x_i + x_{i+1}}{2}\right), \quad x_i \leq x_m < x_{i+1},$$

where j is smaller than or equal to I.

According to another embodiment, the cumulative distribution of $X_m$ is estimated based on Gaussian mixture distributions. Established methods, such as expectation maximization (EM) can be used to estimate the parameters $\mu_{m,q}$ and $\sigma_{m,q}^2$, $q = 1, \ldots, Q$ of the order-Q Gaussian mixture distribution of $X_m$ from a given set of data $D = \{x^{(1)}, x^{(2)}, \ldots, x^{(N)}\}$. Note that a larger cardinality N of D facilitates a larger order Q. This leads to a probability distribution of the following form:

$$f_{X_m}(x_m) = \sum_{q=1}^{Q} \frac{1}{\sqrt{2\pi\sigma_{m,q}^2}} e^{-\frac{(x - \mu_{m,q})^2}{2\sigma_{m,q}^2}}, \quad x_m \in \mathbb{R},$$

which can approximate any probability distribution to a desired precision for sufficiently high Q (but, as stated, Q should not be set too large for a limited cardinality of D). The cumulative distribution of $X_m$, for the Gaussian mixture model, is:

$$F_{X_m}(x_m) = \frac{1}{2} \sum_{q=1}^{Q} \text{erfc}\left(-\frac{x_m - \mu_{m,q}}{\sqrt{2}\,\sigma_{m,q}}\right), \quad x \in \mathbb{R}.$$

where the erf is the error function, and erfc is the complementary error function.

Regarding the mapping $F_{Z_m}^{-1}$, if $Z_m = Y_m$ (a uniform distribution on the interval [0,1]) or $Z_m = Y_m - \frac{1}{2}$ (a uniform distribution on the interval [−½, ½) then the mapping $F_{Z_m}^{-1}$ can be implemented by using conventional methods. It is noted that Gaussians are light-tailed and may work well as input to a machine-learning system.

If $Z_m$ is desired to be a Gaussian random variable then $F_{Z_m}^{-1}$ is to be an inverse mapping of the cumulative function of a Gaussian. In this case the following procedure can be implemented in embodiments of the disclosure. It is assumed that the desired pre-processed feature Y has unity variance. Then, $F_{Z_m}(z_m)$ can be written as:

$$F_{Z_m}(z_m) = \frac{1}{2}\mathrm{erfc}\left(-\frac{z_m}{\sqrt{2}}\right).$$

From this follows (for this example):

$$F_{Z_m}^{-1}(z_m) = \sqrt{2}\,\mathrm{erfc}^{-1}(2z_m) = \sqrt{2}\,\mathrm{erf}^{-1}(1-2z_m).$$

$$F_{Z_m}^{-1}(F_{X_m}(x_m)) = \sqrt{2}\,\mathrm{erfc}^{-1}(2F_{X_m}(x_m)) = \sqrt{2}\,\mathrm{erf}^{-1}(1-2F_{X_m}(x_m)).$$

The erf, erfc and inverse functions are well known in the art and readily available on a plurality of platforms.

Figure 7:
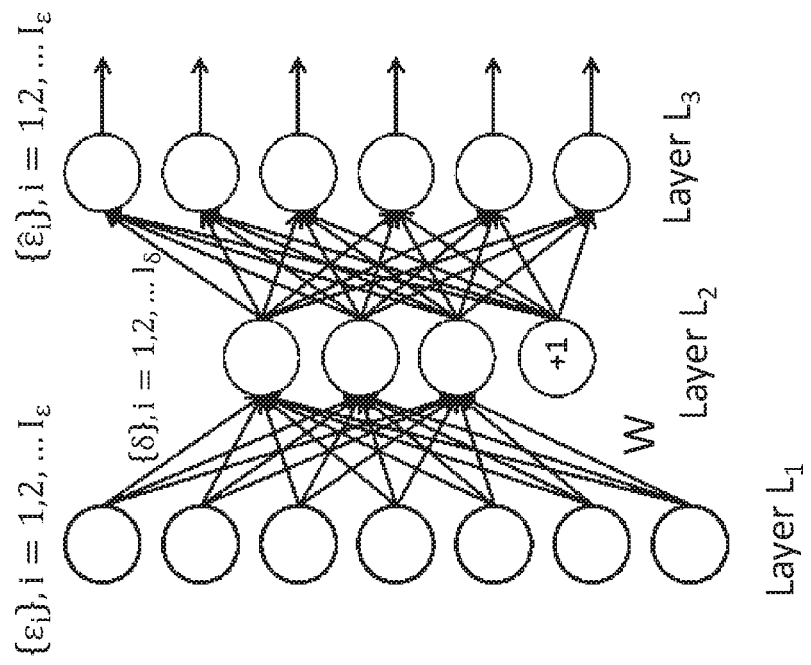
FIG. 7 shows a schematic diagram illustrating a neural network that can be implemented in devices and methods according to embodiments of the disclosure.

In an embodiment, the neural network implemented by the processor 205 of the apparatus 200 is an auto-encoder neural network, in particular an auto-encoder neural network for unsupervised learning, which is trained by setting the output values to be equal to the input values and applies backpropagation to learn the weights. FIG. 7 shows a schematic diagram of an auto-encoder that is configured to learn the function so that output $\hat{\varepsilon}$ is similar to $\varepsilon$ and that can be implemented as a neural network in the apparatus 200, 300 according to an embodiment.

In neural networks, the input values, which are passed into a node, are multiplied by the weights associated to the connections and summed, e.g.:

$$\delta = W^T \varepsilon$$

Then the activation function determines the output value of the node. The sigmoid (logistic) function is one of the most commonly used nonlinear functional forms of activation functions, e.g.:

$$f(\varepsilon) = \frac{1}{1 + \exp(-\varepsilon)}$$

It is noted that, as an interim layer in whole auto-encoder networks, the dimension $I_\delta$ of $\delta$ is always less than the dimension $I_\varepsilon$ of $\hat{\varepsilon}$. In practice, one can refer to $\delta$, and adopt a following multi-input-single-output neutral network (e.g., the multi-layer perception as described below) to output the single value (MOS score). The dimension reduction herein is useful to reduce the redundancy of original feature vectors to improve the performance of whole machine learning system, as is known to the person skilled in the art.

Figure 8:
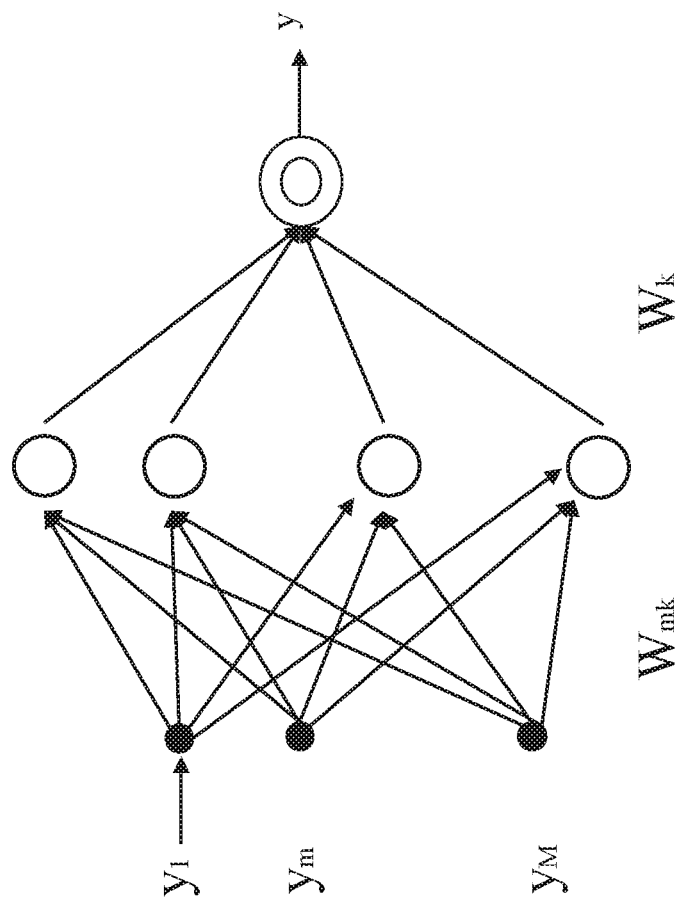
FIG. 8 shows a schematic diagram illustrating a neural network that can be implemented in devices and methods according to embodiments of the disclosure.

Other types of neural networks can be implemented in the apparatus 200, 300 as well. In an embodiment, the neural network implemented in the apparatus 200, 300 is for example based on multi-layer perception (MLP), e.g. a supervised learning method. FIG. 8 shows a schematic diagram illustrating an exemplary one layer MLP, which could be implemented in the apparatus 200, 300 in an embodiment, as well as the output estimated by the MLP.

In the example shown in figure, the MLP can be considered to comprise all network connections. Assuming the feature dimension of the feature vector $y_m$ is M, the size of the input layer of the MLP is M. In the example shown in FIG. 8, the size of the single hidden layer is chosen to be K. Therefore, the network is an M-input-1-output system, wherein, in an embodiment, the output y could be the MOS score provided by the apparatus 200 (or a related variable, such as the distortion between the values 0 and 1.0 and the like).

The mapping described above can be expressed mathematically in the following form:

$$y = G_2(\Sigma_{k=1}^K W_k G_1(\Sigma_{m=1}^M W_{mk} y_m)),$$

wherein $W_{mk}$ denotes the weight of the mapping function from the input layer to the hidden layer and $W_k$ denotes the weight of the mapping function from the hidden layer to the output y. In an embodiment, the mapping functions can be two sigmoid functions, for instance the two following sigmoid functions:

$$G_1(x) = \frac{2}{1 + \exp(-\alpha \cdot x)} - 1, \text{ and } G_2(x) = \frac{1}{1 + \exp(-\alpha \cdot x)},$$

wherein α denotes the slope factor between the values 0 and 1.

In an embodiment, the apparatus 200, 300 can be considered to process each speech file, i.e. audio signal sample, in a frame-wise manner. In other words, each speech file can be divided into several frames. In this case, $y_m$ can be generalized to $y_m(n)$ wherein n (in this context) denotes the frame index. Thus, in an embodiment based, for instance, on a MLP neural network, a single MOS score (or distortion) can be obtained for each frame and the average of the per-frame MOS score (or distortion) can be defined as the MOS score of the speech file.

The second candidate is still based on frame-wise features $x_m(n)$ but, in an embodiment, a new variable $x_m^{file}$ can be defined as the total feature of the speech file, which is composed of the statistics of the frame-wise features. In an embodiment, a specific implementation of the statistics of the frame-wise features could be composed of the mean, variance, the $3^{rd}$ order and the $4^{th}$ order moment of the frame-wise features.

As can be taken from the description above, embodiments of the disclosure can be implemented using any machine learning method and can be frame-based or file-based.

As already described above, embodiments of the disclosure can be implemented advantageously within the whole chain of machine learning for speech quality assessment, which often has to deal with features having irregular distributions (for instance a bimodal distribution). Embodiments of the disclosure can deal witch such features having irregular distributions without degrading the final performance of quality evaluation. As already described above, the pre-processor 203, 303 of the apparatus 200, 300 is configured to map the raw feature vector extracted from an audio signal sample to its cumulative distribution (for example between 0 and 1.0) to form a better representation of the features as an input to the neural network implemented by the processor 205, 305 for determining the PNN or the MOS score.

Figure 11:
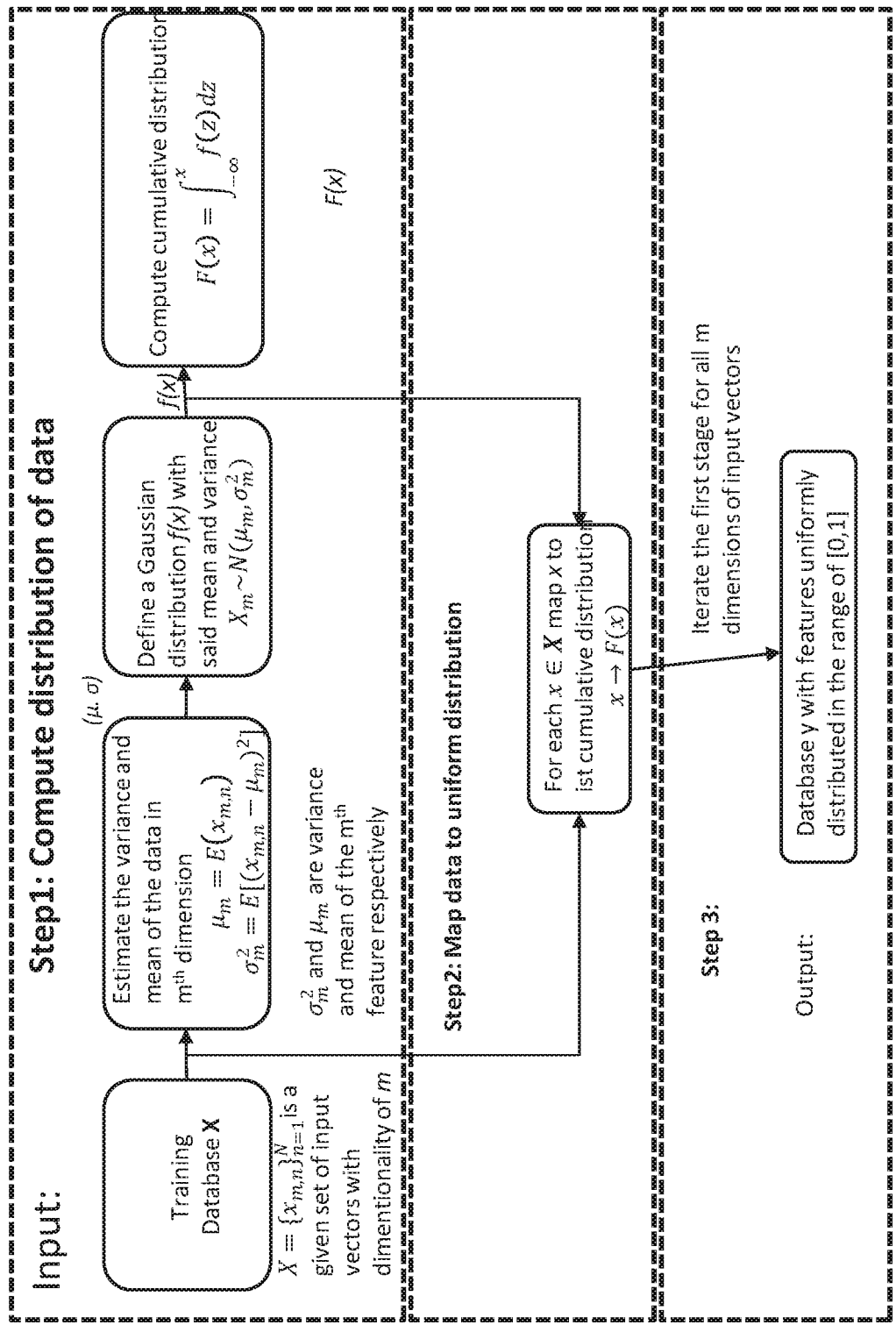
FIG. 11 shows a schematic diagram illustrating a pre-processing stage implemented in devices and methods according to embodiments of the disclosure.

In an embodiment, e.g. as shown in FIG. 11, a process of estimating the distribution of features is implemented in the pre-processor 203, 303 of the apparatus 200, 300. In a first step a Gaussian mixture, e.g. a linear combination of Gaussian distribution functions, is fitted to the distribution of the one-dimensional random variable $X=\{x_{m,n}\}_{n=1}^{N}$. In a second step the cumulative distribution function for each dimension $F(x)=\int_{-\infty}^{x} f(z)dz$ is determined, which is the sum of weighted displaced erf functions.

In a third step, one can implement the above operations to some or all dimensions of the feature vectors to get the cumulative distribution function for each of the dimensions of the feature vector, which will be uniformly distributed in the range of [0,1]. For inputs in a higher dimensional space (assuming, m=1, 2, . . . , M), the process is repeated for each feature. m is the index of the feature of the feature vector, also referred to as feature vector dimension, N is the data size. The output of the whole pre-processing is database Y.

Figure 9:
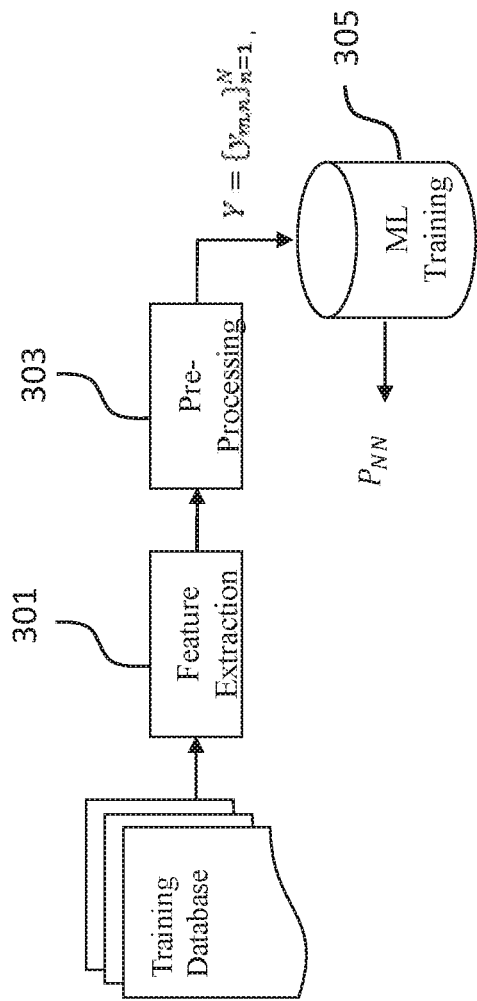
FIG. 9 shows a schematic diagram illustrating the main processing steps implemented in an apparatus for determining a set of neural network parameters (PNN) for determining a quality score (MOS) for an audio signal sample according to an embodiment.

FIG. 9 shows schematically an apparatus 300 for training a neural network for non-intrusive quality assessment, e.g. for determining a set of neural network parameters (PNN) for determining a quality score (MOS) for an audio signal sample. As illustrated in FIG. 9, the training process starts with providing a training database, which is composed of N speech samples. The extractor 301 is configured to apply a feature extraction for each speech sample to obtain the extracted feature vector $X:\{x_{m,n}\}_{n=1}^{N}$. Thereafter, a pre-processing stage 303 is applied to the feature vector to map the feature vector into a modified or pre-processed feature vector $Y=\{y_{m,n}\}_{n=1}^{N}$. At the processor 305 the modified feature vector $\tilde{Y}=\{y_{m,n}\}_{n=1}^{N}$ is used for machine learning to obtain the set of neural network parameters $P_{NN}$. It is noted that in the training stage, each pair of training samples can include the $y_{m,n}$ and the related MOS score (for supervised learning). In an embodiment, the machine learning training is targeted to get an optimum $P_{NN}$, e.g. a $P_{NN}$ which leads to a minimal distortion.

In the following an exemplary embodiment of the apparatus 300 will be described, which is based on the non-intrusive waveform model of speech quality evaluation defined in the standard ITU-T P.563. According to this standard the feature extraction is divided into the following three parts: Pitch synchronous vocal tract model and LPC analysis; Speech reconstruction and full-reference perceptual model; and Distortion-specific parameters. In an embodiment, the dominant distortion classification and perceptual weighting can be replaced by machine learning.

In the exemplary embodiment, the extractor 301 is based on the standard ITU-T P.563, which generates 43 features for each speech file or corresponding audio signal sample. Thus, in this case, the feature vector $x=\{x_{m,n}\}_{m=1}^{43}$ has 43 components, i.e. a dimensionality of M=43. Under the assumption that there are N training data in the training set $X=\{x_{m,n}\}_{n=1}^{N}$, where each training data has a dimensionality of 43: $x(n)=\{x_{m,n}\}_{m=1}^{43}$, the following steps are performed for each of the 43 features. In a first step the variance and mean for $\{x_{m,n}\}_{n=1}^{N}$ is estimated, e.g. by: $\mu_m=E(x_{m,n})$ $$\sigma_m^2=E[(x_{m,n}-\mu_m)^2].$$

In a second step a Gaussian distribution $f(x)$ with said mean and variance is defined, e.g.

$$X_m \sim \mathcal{N}(\mu_m, \sigma_m^2).$$

In a third step the cumulative distribution function is determined, e.g.:

$$F(x)=\int_{-\infty}^{\infty} f(z)dz.$$

In a fourth step, for n=1 to N, $x(n)=\{_{m,n}\}_{m=1}^{43}$ is mapped to its cumulative distribution function, e.g.

$$x_{m,n} \rightarrow y_{m,n}=F(y_{m,n})$$

The pre-processed feature vector, named by $Y=\{y_{m,n}\}_{n=1}^{N}$ can be used for further training. In an embodiment, the parameters $\{\mu_m, \sigma_m^2\}_{m=1}^{43}$ can be saved for pre-processing additional data.

An embodiment using the same processing, in particular the same pre-processing is shown in FIG. 11, for an arbitrary number M of features or dimension M of the feature vectors, and a uniform distribution for Y, as previously described, after mapping the feature values x to Y based on the cumulated distribution function.

Figure 10:
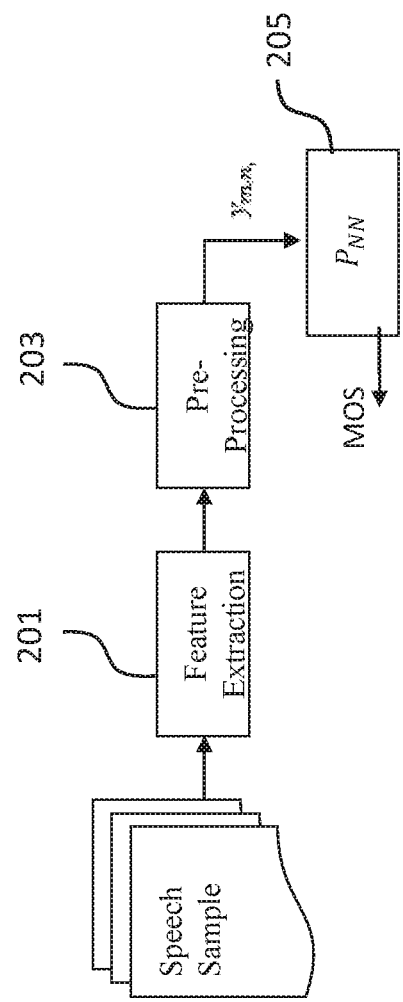
FIG. 10 shows a schematic diagram illustrating the main processing steps implemented in an apparatus for determining a quality score (MOS) for an audio signal sample according to an embodiment.

In comparison to the training process, the process of applying the PNN to an audio signal sample is simpler, as this just involves applying the PNN, which have been determined during the training process, as is illustrated in FIG. 10, and typically the same feature extraction and pre-processing is used for the training to obtain optimum evaluation results.

At the extractor 201 of the apparatus 200, the following steps are performed. For the $n^{th}$ speech file, e.g. audio signal sample, a pre-processing algorithm is used to obtain the features of the $n^{th}$ speech file.

In an embodiment, a feature extraction according to the non-intrusive quality estimation standard P.563 is implemented in the extractor 201 (e.g. like for extractor 301). As already described above, a feature extraction in accordance with the P.563 standard generates 43 features for each speech sample, e.g. a feature vector $x(n)=\{x_{m,n}\}_{m=1}^{43}$ having 43 components.

In an embodiment the pre-processor 203 is configured (e.g. like pre-processor 303) to map the features of the feature vector $x(n)=\{x_{m,n}\}_{m=1}^{43}$ to a more even distribution, e.g. to map the features $x(n)=\{x_{m,n}\}_{m=1}^{43}$ to the features $y(n)=\{y_{m,n}\}_{m=1}^{43}$ having a uniform probability distribution.

In an exemplary embodiment, the apparatus 200 is configured to apply the same pre-processing as the apparatus 300, e.g. process or map the feature value based on the same cumulative distribution function as used for the training.

In another exemplary embodiment, the apparatus 200 is configured to process, e.g. use as input, a training set of N audio signal samples, e.g. $X=\{x_{m,n}\}_{n=1}^{N}$, wherein each audio signal sample provides a feature vector $x(n)=\{x_{m,n}\}_{m=1}^{43}$ having 43 components. Furthermore, for m=1 to 43, e.g. for each feature of the feature vector, the pre-processor 203 is configured to perform the following steps.

In a first step the variance $\sigma_m^2$ and mean $\mu_m$ for $\{x_{m,n}\}_{j=1}^{N}$, which have been obtained during the training stage and which are given by the following equations:

$$\mu_m=E(x_{m,n}),$$

and $$\sigma_m^2=E[(x_{m,n}-\mu_m)^2$$

wherein $E(x_m)$ denotes the expectation value of the feature $x_m$ are loaded into the apparatus 200.

In a second step a Gaussian distribution $f(x)$ with said mean and variance is defined, e.g. $x_m \sim \mathcal{N}(\mu_m, \sigma_m^2)$.

In a third step a cumulative distribution function is computed, e.g. $F(x)=\int_{-\infty}^{\infty} f(z)dz$.

In a fourth step, for n=1 to N the feature $x_{m,n}$ is mapped to a function value of the corresponding cumulative distribution function, e.g. $x_{m,n} \rightarrow y_{m,n}=F(y_{m,n})$.

In any of the above embodiments, the pre-processed feature vector $\tilde{Y}=\{y_{m,n}\}_{n=1}^{N}$ is used by the processor 205 for determining the MOS. For determining the quality score (MOS) the processor 205 applies the parameters $P_{NN}$ from the training set to y(n).

FIG. 11 shows a diagram illustrating the pre-processing stage for the two examples described above.

Figure 12:
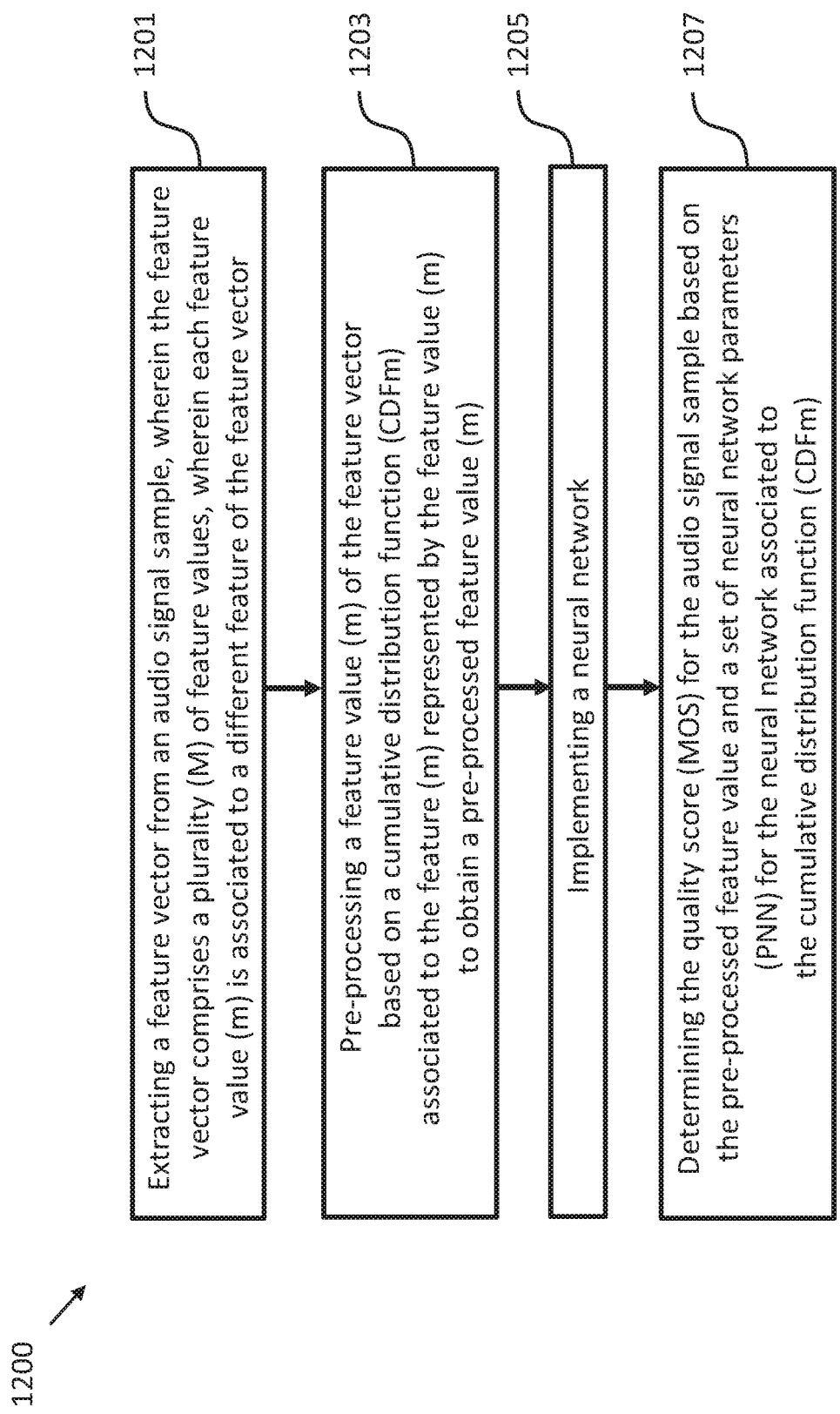
FIG. 12 shows a schematic diagram of a method for determining a quality score (MOS) for an audio signal sample according to an embodiment.

FIG. 12 shows a schematic diagram of a method 1200 for determining a quality score (for example MOS) for an audio signal sample according to an embodiment. The method 1200 comprises the steps of extracting 1201 a feature vector from the audio signal sample, wherein the feature vector comprises a plurality of feature values and wherein each feature value is associated to a different feature of the feature vector, pre-processing 1203 a feature value of the feature vector based on a cumulative distribution function associated to the feature represented by the feature value to obtain a pre-processed feature value, implementing 1205 a neural network, and determining 1007 the quality score (MOS) for the audio signal sample based on the pre-processed feature value and a set of neural network parameters (PNN) for the neural network associated to the cumulative distribution function.

FIG. 13 shows a method 1300 for determining a set of neural network parameters (PNN) for determining a quality score (for example MOS) for an audio signal sample according to an embodiment. The method 1300 comprises the steps of extracting 1301 a feature vector from the audio signal sample, wherein the feature vector comprises a plurality of feature values and wherein each feature value is associated to a different feature of the feature vector, pre-processing 1303 a feature value of the feature vector based on a cumulative distribution function associated to the feature represented by the feature value to obtain a pre-processed feature value, implementing 1305 a neural network, and determining 1307 based on the pre-processed feature value the set of neural network parameters (PNN) for the neural network for determining the quality score (MOS) for the audio signal sample.

Embodiments of the apparatus 200 will typically use the same feature extraction (e.g. same feature extraction algorithms or steps) 201 and pre-processing (e.g. same pre-processing algorithms or steps) 203 as the corresponding embodiments of the apparatus 300 because embodiments of the apparatus 200 are typically configured to use the parameters, e.g. neural network parameters PNN and/or the cumulative distribution functions CDF, learned or obtained during a training by embodiments of the apparatus 300 to obtain optimum quality scores, e.g. MOS. In other words the explanations provided for embodiments of the feature extractor 201 or the respective feature extraction step or stage 201, also apply to embodiments of the respective feature extractor 301 or respective feature extraction step or stage 301, and vice versa. Correspondingly, the explanations provided for embodiments of the pre-processor 203 or respective pre-processing step or stage 203, also apply to embodiments of the respective pre-processing 301 or respective pre-processing step or stage 301, and vice versa.

Embodiments of the apparatus 200 and 300 may be configured to pre-process only one, some or all of the features of the feature vector as described above.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Embodiments of the disclosure maybe implemented in hardware or software or any combination thereof. In particular, the extractor, the pre-processor and the processor maybe implemented as separate entities, or partly or completely integrated entities of software and/or hardware. Furthermore, embodiments of the apparatus may comprise a memory to store program code, which allows when executed on a processor (or the extractor, co-processor and processor), to perform the functionalities of the embodiments as described herein.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An apparatus for determining a quality score for an audio signal sample, wherein the apparatus comprises:
   a pre-processor configured to pre-process a feature value of the feature vector extracted from the audio signal sample to obtain a pre-processed feature value, wherein the feature vector comprises a plurality of feature values, and wherein each feature value is associated with a feature of the feature vector, wherein pre-processing the feature value is based on a cumulative distribution function (CDFm) associated with the feature represented by the feature value to obtain a pre-processed feature value, and pre-processing the feature value comprises:
   (i) mapping the feature value of the feature to a function value of the CDFm associated with the feature to obtain an intermediate feature value, and mapping the intermediate feature value to a function value of an inverse distribution function associated with the feature to obtain the pre-processed feature value, wherein the inverse distribution function is an inverse distribution function of the CDFm associated with the feature, which is different to an original distribution function associated with the feature, or (ii) mapping the feature value of the feature vector to a function value of a combined distribution function to obtain the pre-processed feature value, wherein function values of the distribution function correspond to function values obtainable by firstly mapping the feature value to the CDFm associated with the feature and secondly mapping the resulting intermediate feature value to a functional value of the inverse distribution function associated with the feature; and a processor configured to:
 implement a neural network, and
 determine the quality score for the audio signal sample based on the pre-processed feature value and a set of neural network parameters for the neural network associated with the CDFm.

2. The apparatus according to claim 1, wherein the CDFm is a uniform distribution function.

3. The apparatus according to claim 1, wherein the CDFm is a uniform distribution function on the interval [0, 1].

4. The apparatus according to claim 1, wherein the processor is configured to determine the quality score for the audio signal sample during a training phase.

5. The apparatus according to claim 1, wherein the processor is configured to implement the neural network as an auto-encoder neural network for unsupervised learning or multi-layer perception (MLP) neural network for supervised learning.

6. The apparatus according to claim 1, wherein the pre-processor is further configured to:
 determine a histogram of feature values associated with a first feature of the plurality of features based on feature values associated with the first feature over a plurality of feature vectors; and
 determine the CDFm associated with the first feature based on the histogram of feature values.

7. The apparatus according to claim 6, wherein the pre-processor is further configured to:
 determine the CDFm associated with the first feature by summing over histogram bins of the histogram of the feature values.

8. The apparatus according to claim 1, wherein the pre-processor is further configured to:
 determine a Gaussian distribution ($\mu$, $\sigma$) for feature values associated with a first feature of the plurality of features based on feature values associated with the first feature over a plurality of feature vectors; and
 determine the CDFm associated with the first feature based on the Gaussian distribution ($\mu$, $\sigma$) for the feature values.

9. The apparatus according to claim 8, wherein the pre-processor is further configured to determine the CDFm associated with the first feature by using a mixture of Gaussian distributions ($\mu$, $\sigma$) for feature values associated with the first feature of the plurality of features.

10. The apparatus according to claim 8, wherein the pre-processor is further configured to determine parameters of the Gaussian distribution ($\mu$, $\sigma$) or a mixture of the Gaussian distributions for feature values associated with the first feature of the plurality of features by using an expectation-minimization algorithm.

11. The apparatus according to claim 1, wherein the processor is configured to determine, based on the pre-processed feature value, the set of neural network parameters for determining the quality score for the audio signal sample.

12. A method for determining a quality score for an audio signal sample, comprising:
 pre-processing a feature value of the feature vector extracted from the audio signal sample to obtain a pre-processed feature value, wherein the feature vector comprises a plurality of feature values, and wherein each feature value is associated with a feature of the feature vector, wherein pre-processing the feature value is based on a cumulative distribution function (CDFm) associated with the feature represented by the feature value to obtain a pre-processed feature value;
 performing mapping, the mapping comprising:
  (i) mapping the feature value of the feature to a function value of the CDFm associated with the feature to obtain an intermediate feature value, and mapping the intermediate feature value to a function value of an inverse distribution function associated with the feature to obtain the pre-processed feature value, wherein the inverse distribution function is an inverse distribution function of the CDFm associated with the feature, which is different to an original distribution function associated with the feature, or
  (ii) mapping the feature value of the feature vector to a function value of a combined distribution function to obtain the pre-processed feature value, wherein function values of the distribution function correspond to function values obtainable by firstly mapping the feature value to the CDFm associated with the feature and secondly mapping the resulting intermediate feature value to a functional value of the inverse distribution function associated with the feature;
 implementing a neural network; and
 determining the quality score for the audio signal sample based on the pre-processed feature value and a set of neural network parameters for the neural network associated with the CDFm.

13. The method according to claim 12, further comprising:
 determining, based on the pre-processed feature value, the set of neural network parameters for determining the quality score for the audio signal sample.

14. The method according to claim 12, wherein the CDFm is a uniform distribution function.

15. The method according to claim 12, wherein the CDFm is a uniform distribution function on the interval [0, 1].

16. The method according to claim 12, further comprising:
 determining the quality score for the audio signal sample during a training phase.

17. The method according to claim 12, further comprising:
 implementing the neural network as an auto-encoder neural network for unsupervised learning or multi-layer perception (MLP) neural network for supervised learning.

18. The method according to claim 12, further comprising:
 determining a histogram of feature values associated with a first feature of the plurality of features based on feature values associated with the first feature over a plurality of feature vectors; and
 determining the CDFm associated with the first feature based on the histogram of feature values.

19. The method according to claim 18, further comprising:
 determining the CDFm associated with the first feature by summing over histogram bins of the histogram of the feature values.

20. The method according to claim 12, further comprising:
  determining a Gaussian distribution ($\mu$, $\sigma$) for feature values associated with a first feature of the plurality of features based on feature values associated with the first feature over a plurality of feature vectors; and
  determining the CDFm associated with the first feature based on the Gaussian distribution ($\mu$, $\sigma$) for the feature values.

21. The method according to claim 20, further comprising:
  determining the CDFm associated with the first feature by using a mixture of Gaussian distributions ($\mu$, $\sigma$) for feature values associated with the first feature of the plurality of features.

22. The method according to claim 20, further comprising:
  determining parameters of the Gaussian distribution ($\mu$, $\sigma$) or a mixture of the Gaussian distributions for feature values associated with the first feature of the plurality of features by using an expectation-minimization algorithm.

* * * * *

UNITED STATES PATENT AND TRADEMARK OFFICE
CERTIFICATE OF CORRECTION

PATENT NO. : 10,984,818 B2
APPLICATION NO. : 16/270274
DATED : April 20, 2021
INVENTOR(S) : Xiao et al.

Page 1 of 1

It is certified that error appears in the above-identified patent and that said Letters Patent is hereby corrected as shown below:

On the Title Page

Page 2, item (56) Other Publications, Citation 15: "Hanet et al, "Data Mining-Concepts and Techniques," 3rd ed.," should read -- Han et al, "Data Mining-Concepts and Techniques," 3rd ed., --.

Signed and Sealed this
Seventeenth Day of May, 2022

Katherine Kelly Vidal
*Director of the United States Patent and Trademark Office*